United States Patent
Lloyd et al.

(10) Patent No.: US 11,775,337 B2
(45) Date of Patent: Oct. 3, 2023

(54) PRIORITIZATION OF THREADS IN A SIMULTANEOUS MULTITHREADING PROCESSOR CORE

(71) Applicant: International Business Machines Corporation, Armonk, NY (US)

(72) Inventors: Bryan Lloyd, Austin, TX (US); Guy L. Guthrie, Austin, TX (US); Susan E. Eisen, Round Rock, TX (US); Dhivya Jeganathan, Austin, TX (US); Luke Murray, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 17/465,228

(22) Filed: Sep. 2, 2021

(65) Prior Publication Data
US 2023/0061030 A1    Mar. 2, 2023

(51) Int. Cl.
*G06F 16/176* (2019.01)
*G06F 9/52* (2006.01)
*G06F 9/48* (2006.01)
*G06F 9/30* (2018.01)

(52) U.S. Cl.
CPC ........ *G06F 9/4818* (2013.01); *G06F 9/30043* (2013.01); *G06F 9/30087* (2013.01); *G06F 9/526* (2013.01)

(58) Field of Classification Search
None
See application file for complete search history.

(56) References Cited

U.S. PATENT DOCUMENTS

| | | | |
|---|---|---|---|
| 5,928,334 A * | 7/1999 | Mandyam | G06F 9/52 709/248 |
| 7,099,974 B2 * | 8/2006 | Hsu | G06F 9/5011 710/242 |
| 7,360,041 B2 | 4/2008 | Guthrie | |
| 8,127,192 B2 | 2/2012 | Arora | |
| 9,390,024 B2 | 7/2016 | Ghai | |
| 10,102,037 B2 | 10/2018 | Accapadi | |
| 10,235,215 B2 | 3/2019 | Arimilli | |
| 10,725,937 B2 | 7/2020 | Williams | |
| 11,650,926 B2 * | 5/2023 | Campbell | G06F 12/0842 711/118 |
| 2003/0163642 A1 * | 8/2003 | Borkenhagen | G06F 12/0837 711/146 |

(Continued)

OTHER PUBLICATIONS

Ahmad et al., "KARD: Lightweight Data Race Detection With Per-Thread Memory Protection", Apr. 19-23, 2021, ACM ISBN 978-1-4503-8317, 14 Pgs. <https:doi.org/10.1145/3445814.3446727>.

(Continued)

*Primary Examiner* — Hyun Nam
(74) *Attorney, Agent, or Firm* — David B. Woycechowsky

(57) ABSTRACT

A first instruction for processing by a processor core is received. Whether the instruction is a larx is determined. Responsive to determining the instruction is a larx, whether a cacheline associated with the larx is locked is determined. Responsive to determining the cacheline associated with the larx is not locked, the cacheline associated with the larx is locked and a counter associated with a first thread of the processor core is started. The first thread is processing the first instruction.

17 Claims, 4 Drawing Sheets

(56) References Cited

U.S. PATENT DOCUMENTS

| | | | | |
|---|---|---|---|---|
| 2006/0010297 | A1* | 1/2006 | Brenner | G06F 9/3834 |
| | | | | 712/E9.032 |
| 2007/0067573 | A1* | 3/2007 | Bruening | G06F 9/3851 |
| | | | | 711/E12.039 |
| 2007/0294489 | A1* | 12/2007 | Brenner | G06F 9/30072 |
| | | | | 712/E9.032 |
| 2009/0198849 | A1* | 8/2009 | Arimilli | G06F 9/3004 |
| | | | | 710/200 |
| 2011/0219215 | A1* | 9/2011 | Blumrich | G06F 12/08 |
| | | | | 712/216 |
| 2012/0185672 | A1 | 7/2012 | Gara | |
| 2014/0047196 | A1 | 2/2014 | Frey | |
| 2017/0068545 | A1 | 3/2017 | Nowak | |
| 2017/0242796 | A1* | 8/2017 | Gschwind | G06F 9/466 |
| 2018/0095736 | A1 | 4/2018 | Gao | |
| 2020/0249946 | A1 | 8/2020 | Ward | |
| 2020/0264886 | A1 | 8/2020 | Roy | |

OTHER PUBLICATIONS

Cain et al., "Robust Architectural Support For Transactional Memory In The Power Architecture", Computer Science, Proceedings of the 40th Annual International Symposium on Computer Architecture, 2013, DOI:10.1145/2485922.2485942, pp. 1-12.

Kristien et al., "Fast And Correct Load-Link/Store-Conditional Instruction Handling In DBT Systems", IEEE Transactions on Computer-Aided Design of Integrated Circuits and Systems, vol. 39, No. 11, pp. 1-11. Nov. 2020, doi:10.1109/TCAD.2020.3013048.

Lev et al., "Scalable Reader-Writer Locks", Copyright 2009 Sun Microsystems, Inc., SPAA/09, Aug. 11-13, 2009, ACM 978-1-60558-606—Sep. 9, 2008, pp. 1-11.

Von Praun., "Deconstructing Redundant Memory Synchronization" IBM T.J. Watson Research Center, Yorktown Heights, Jan. 2005, pp. 1-7.

* cited by examiner

PRIORITIZATION OF THREADS IN A SIMULTANEOUS MULTITHREADING PROCESSOR CORE

BACKGROUND

The present invention relates generally to the field of simultaneous multithreading (SMT) processor cores, and more particularly to prioritization of threads in a SMT processor core during a memory lock sequence.

SMT is a technique for improving overall efficiency of central processing units (CPU) with hardware multithreading. SMT allows for multiple independent threats to execute in a more optimized manner to better utilize the resources provided in modem processor architectures.

SMT allows for multiple threads to be executed simultaneously by one CPU core. Additionally, SMT allows for processing of multiple tasks, including access to different page tables, different task state segments, different protection rings, different I/O permissions, etc., by one CPU core.

SUMMARY

Embodiments of the present invention include a computer-implemented method, computer program product, and system for prioritization of threads. In an embodiment, a first instruction for processing by a processor core is received. Whether the instruction is a larx is determined. Responsive to determining the instruction is a larx, whether a cacheline associated with the larx is locked is determined. Responsive to determining the cacheline associated with the larx is not locked, the cacheline associated with the larx is locked and a counter associated with a first thread of the processor core is started. The first thread is processing the first instruction.

DETAILED DESCRIPTION

Embodiments of the present invention recognize that in typical multi processor systems, there exists the general concept of locking a region of memory by one processor so that a processor has exclusive temporary access to a region of memory, also called a memory lock. Embodiments of the present invention recognize that in a memory subsystem involving multiple cores, a larx instruction will acquire and reserve exclusive ownership of a cacheline for the processor executing a larx instruction such that other processors cannot acquire, or store to, that cacheline temporarily. Embodiments of the present invention recognize that a subsequent stcx instruction will lock ownership of that cacheline by the processor indefinitely, by storing a lock value to that cacheline if the cacheline is not already locked by another processor. Embodiments of the present invention recognize that a subsequent store to release lock instruction by that same processor will relinquish ownership of that cacheline by storing an unlock value to that cacheline. Embodiments of the present invention recognize that after the stcx of thread A, it is possible that the lock release store for thread A is unable to end the lock sequence due to issues accessing shared resources in ISQ 136. Embodiments of the present invention recognize that thread B may become stalled from proceeding further from processing instructions while waiting for thread A to release its lock. Embodiments of the present invention recognize that thread B may fill the ISQ 136 with instructions which may prevent thread A from processing instructions that allow for the lock sequence to end, thus unable to free up resources needed by thread B. Embodiments of the present invention recognize that this may create a deadlock in the ISQ 136 between thread A and thread B which will be eventually resolved after a forward progress detector set to a very high timeout value detects a hang in the ISQ 136 (about 32,000 cycles) and flushes al instructions of all threads from ISQ 136 that have been dispatched.

Embodiments of the present invention provide for a system to flush the ISQ 136 of all instructions except for the thread that currently has a lock set for the longest period of time greater than a threshold. Embodiments of the present invention provide for a system to determine the number of cycles ISQ 136 is full and a thread 132-$n$ has a lock set on a cacheline.

Figure 1:
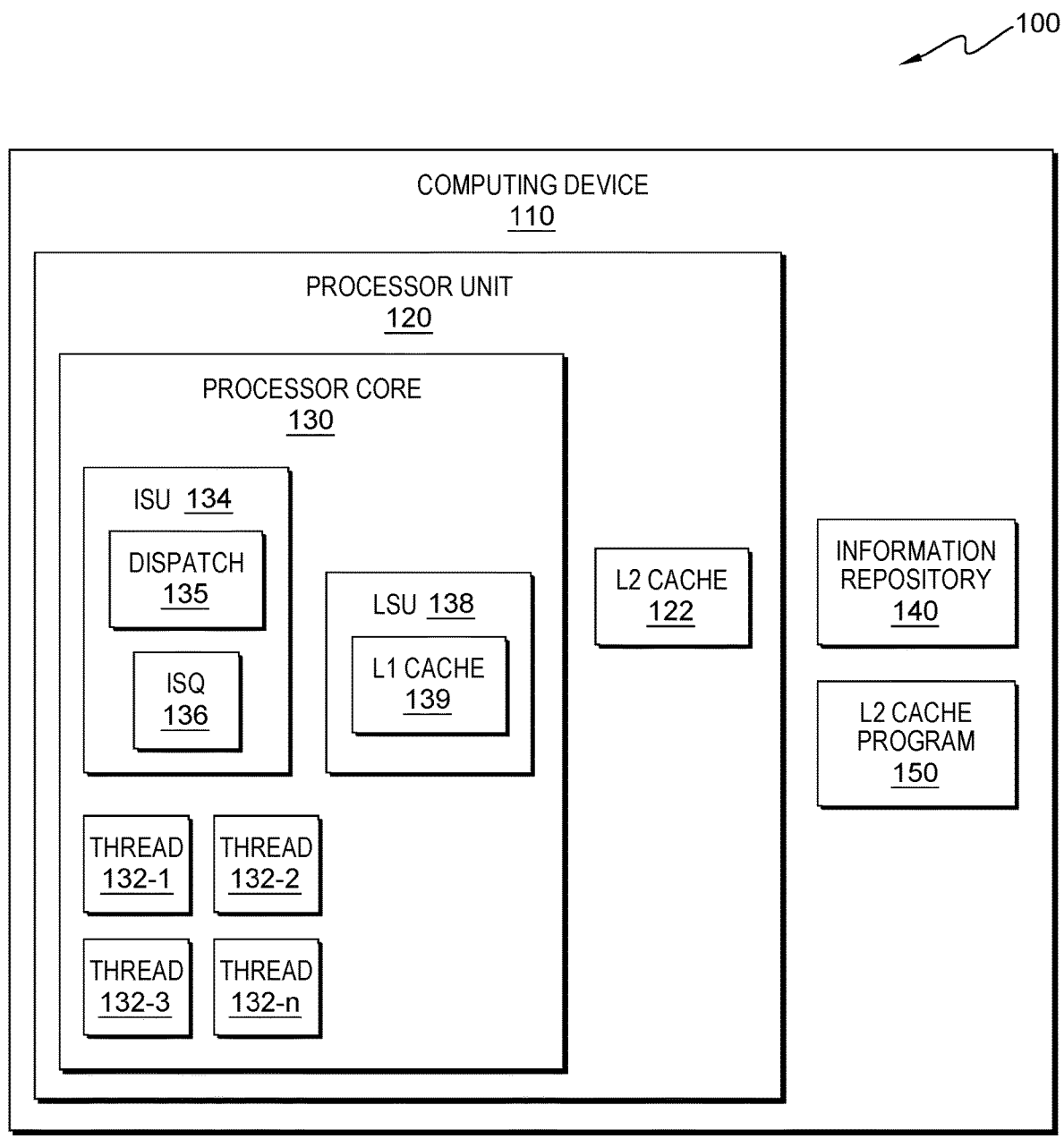
FIG. 1 is a functional block diagram of a network computing environment, generally designated 100, suitable for operation of L2 cache program 150, in accordance with at least one embodiment of the invention.

Referring now to various embodiments of the invention in more detail, FIG. 1 is a functional block diagram of a network computing environment, generally designated 100, suitable for operation of L2 cache program 150, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims. It should be noted, L2 cache program 150 is being discussed as a single program for simplicity. However, steps of workflow 200 and workflow 300 of L2 cache program 150 may be performed by an L2 unit associated with L2 cache 122, dispatch 135, ISU 134, LSU 138, or any other hardware/software unit in processor unit 120.

Network computing environment 100 includes computing device 110. In an embodiment, server device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, server device 110 represents any programmable electronic devices or combination of programmable electronic devices capable of executing machine readable program instructions and communicating with other computing devices (not shown) within computing environment 100. In an embodiment, computing device includes processing unit 120 that includes at least two or more threads such that allow for simultaneous multithreading (SMT) in the processing unit 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g., database server computers, application server computers, web servers, and media servers) that act as a single pool of seamless resources when accessed within network computing environment 100.

In an embodiment, server device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, server device 110 includes processor unit 120, information repository 140, and L2 cache program 150.

In an embodiment, computing device 110 includes processor unit 120. In an embodiment, processor unit 120 may also be known as a central processing unit (CPU). In simplest terms, processor unit 1020 is a digital circuit which performs operations on some external data source, for example L2 cache 122. In an embodiment, processor unit 120 may include processor core 130 and L2 cache 122.

In an embodiment, processor unit 120 includes L2 cache 122. In an embodiment, L2 cache 122 may be a processor unit 120 cache that is located external and separate to the processor core 130. In an embodiment, L2 cache 122 may also be called a secondary cache or an external cache. In an embodiment, L2 cache 122 may be any data storage that serves as a bridge between the processor core 130 on chip cache, L1 cache 139, and data stored in main memory of computing device 110 such as, but not limited to, L3 cache (not shown), information repository 140, etc. In an embodiment, L2 cache 122 includes an L2 unit (thought of a hardware logic block) that includes aspects of L2 cache program 150, noted above. In an embodiment, L2 unit is the hardware logic block that requests exclusive access to a cacheline from the memory subsystem when the larx executes. In an embodiment, the L2 unit is the hardware logic block that tracks the thread n locked state. In an embodiment, this tracking may be done in the L2 cache 122 and/or information repository 140. In simplest terms, the L2 unit decides whether or not to relinquish exclusive access of a cacheline that a larx instruction requests in the event that another processor core (not shown) in computing device 110 would also like exclusive access to that cacheline.

In an embodiment, the L2 cache 122 is a cache that receives loads that miss on the L1 cache 139 and all stores. Stores will write into the L2 cache 122. In an embodiment, the L2 cache 122 is the point of memory coherency in the system and includes lock reservation, address reservation, and registers along with all associated tracking to that address. In an embodiment, each thread (i.e., thread 132-$n$) in the in the processor core 130 has a lock reservation register in the L2 cache 122. If the instruction sent from the LSU 138 is a larx, the reservation address is set to monitor whether any other processor stores to the line. If the instruction sent from the LSU 138 is a stcx, a store is done into the L2 cache 122 if the lock reservation address previously set by a larx has not had any stores from another processor store into that address. The L2 cache 122 signals to the LSU 138 whether the stcx was successful or not in storing. In an embodiment, the L2 cache 122 includes any number of 128 byte cachelines based on the size of the L2 cache 122.

In an embodiment, processor unit 120 includes processor core 130. In an embodiment, processor unit 120 may include any number of processor core 130. For example, dual core, quad core, octa core, etc. For simplicity, processor unit 120 is shown including a single processor core 130. In an embodiment, processor core 130 may be an individual processor that receives instructions and performs calculations or operations as per the instructions. In an embodiment, processor core 130 includes instruction sequencing unit (ISU) 134, Load Store Unit (LSU) 138, and any number of threads 132-$n$.

In an embodiment, processor core 130 includes thread 132-$n$. As shown, in this embodiment, processer core 130 includes thread 132-1, 132-2, 132-3, and 132-$n$. In other words, in this embodiment, processor core 130 includes four threads. In an alternative embodiment, processor core 130 can include any number of threads. For simplicity, thread 132-$n$ will now be discussed in reference to thread 132-1, 132-2, 132-3, and 132-$n$. In an embodiment, thread 132-$n$ is the virtual component or code which divides the physical processor core 130 into virtual multiple cores. In an embodiment, thread 132-$n$ is a virtual version of processor core 130 that manages the instructions. In an embodiment, thread 132-$n$ is created by the operating system of computing device 110.

In an embodiment, processor core 130 includes ISU 134. In an embodiment, ISU, also known as an instruction sequencing unit, organizes program instructions to be fetched from memory (i.e., L2 cache 122), and executed, in an appropriate order, and for forwarding the program instructions to the ISQ 136. In an embodiment, ISU 134 includes dispatch 135 and issue queue (ISQ) 136.

In an embodiment, dispatch 135 dispatches instruction into the ISQ 136 based on availability of the ISQ 136 entries. In an embodiment, dispatch 135 switches between threads 132-1-132-$n$ to dispatch the instructions in a set manner, such as every cycle.

In an embodiment, ISQ 136 receives instructions of multiple threads (i.e., threads 132-1-132-$n$) from dispatch 135. In an embodiment, ISQ 136 tracks register dependencies and, once dependencies are resolved for an instruction, the instruction is issued to the LSU 138.

In an embodiment, processor core 130 includes LSU 138. In an embodiment, LSU 138, also known as the load store unit, receives load and store instructions from ISQ 136. In an embodiment, LSU 138 includes L1 cache 139. In an embodiment, loads and stores will access L1 cache 139, found in LSU 138. In an embodiment, LSU 138 includes L1 cache 139. In an embodiment, loads and stores will access L1 cache 139, found in LSU 138. In an embodiment, loads that miss the L1 cache 139 (i.e., the data is not found in L1 cache 139) will be sent to L2 cache 122. In an embodiment, if the load is a larx, the load will be sent to the L2 cache 122.

In an embodiment, all stores received by LSU 138 will be sent to the L2 cache 122 as a write through of the L1 cache 139.

In an embodiment, LSU 138 includes L1 cache 139. In an embodiment, the L1 cache 139 is the fastest memory in computing device 110 and is closest, in access time/speed, to the processor core 130. In an embodiment, the L1 cache 139 is built directly into the processor core 130. In an embodiment, the L1 cache 139 may be called a primary cache, internal cache, and/or system cache. In an embodiment, the L1 cache 139 has a zero wait-state interface. In an embodiment, the L1 cache 139 is used to store data that was accessed by the processor core 130 recently, critical files that need to be executed immediately and it is the first cache to be accessed and processed when the processor core 130 itself performs a computer instruction requiring a memory access.

In an embodiment, computing device 110 includes information repository 140. In an embodiment, information repository 140 may be managed by L2 cache program 150. In an alternative embodiment, information repository 140 may be managed by the operating system of computing device 110, another program (not shown), alone, or together with, L2 cache program 150. Information repository 140 is a data repository that can store, gather, and/or analyze information. In an embodiment, information repository 140 is stored on computing device 110. In some embodiments, information repository 114 may reside on another computing device (not shown), provided information repository 140 is accessible by computing device 110. In an embodiment, information repository 140 may include data, including, but not limited to, cycle threshold information for each thread 132-$n$, number of cycles for thread 132-$n$ when the ISQ 136 is full, reservations for cache lines in L2 cache 122 (lock and unlock), lock critical section for threads, lock critical section counter, etc. As noted above, some and/or all of the information found in information repository 140 may be found in hardware units and/or hardware logic found in ISU 134, LSU 138, and/or L2 cache 122.

Information repository 140 may be implemented using any volatile or non-volatile storage media for storing information, as known in the art. For example, information repository 140 may be implemented with a tape library, optical library, one or more independent hard disk drives, multiple hard disk drives in a redundant array of independent disks (RAID), solid-state drives (SSD), or random-access memory (RAM). Similarly, information repository 140 may be implemented with any suitable storage architecture known in the art, such as a relational database, an object-oriented database, or one or more tables. As noted above, information repository 140 is being describe for simplicity as a single piece of hardware, however some and/or all aspects of information repository 140 along with some and/or all data found and describe in information repository 140 may be found in information repository 140, hardware units and/or hardware logic found in ISU 134, LSU 138, and/or L2 cache 122.

Embodiments of the present invention provide for a L2 cache program 150 for setting and resetting thread 132-$n$ cycles. In an embodiment, L2 cache program 150 receives an instruction for processing. In an embodiment, L2 cache program 150 determines whether the instruction is a larx. In an embodiment, L2 cache program 150 processes the instruction. In an embodiment, L2 cache program 150 checks the cacheline. In an embodiment, L2 cache program 150 determines whether the cacheline is lock. In an embodiment, L2 cache program 150 returns a lock indication. In an embodiment, L2 cache program 150 locks the cacheline. In an embodiment, L2 cache program 150 processes the stcx. In an embodiment, L2 cache program 150 receives stw. In an embodiment, L2 cache program 150 unlocks the cacheline.

Embodiments of the present invention provide for a L2 cache program 150 for flushing ISQ 136. In an embodiment, L2 cache program 150 receives an instruction for processing by thread 132-$n$. In an embodiment, L2 cache program 150 determines whether the ISQ 136 is full. In an embodiment, if the ISQ 136 is not full, L2 cache program 150 adds the instruction to ISQ 136. In an embodiment, L2 cache program 150 determines the number of cycles ISQ 136 is full and thread 132-$n$ is set. In an embodiment, L2 cache program 150 determines whether the number is greater than a threshold. In an embodiment, if the number is greater than a threshold, L2 cache program 150 flushes all instructions for threads 132 from ISQ 136 except instructions from thread 132-$n$.

It should be noted, in an embodiment, L2 cache program 150 will be discussed in reference to load and reserve indexed (larx) and store conditional indexed (stcx) instructions. Here, a larx instruction loads the requested data and sets a reservation for the requested data. The reservation can then be cleared by a subsequent stcx instruction that stores to a data location only if another processor and/or mechanism store operation has not intervened between the execution of the larx instruction and the stcx instruction. In an embodiment, the larx instruction may be a lwarx (4 byte load), ldarx (8 byte load), lharx (half-word load), or lbarx (single byte load) but will be discussed as a larx for simplicity. In an embodiment, the stcx instruction may be a stwcx (4 byte store), stdcx (8 byte store), sthcx (half-word store), or stbcx (single byte store) but will be discussed as a stcx for simplicity. In an embodiment, the size of the larx, stcx, and lock release store (e.g., lwarx, stwx, stw) are the same size and to the same exact address. In an alternative embodiment, the size of the larx, stcx, and lock release store (e.g., lwarx, stwx, stw) may be different sizes.

Figure 2:
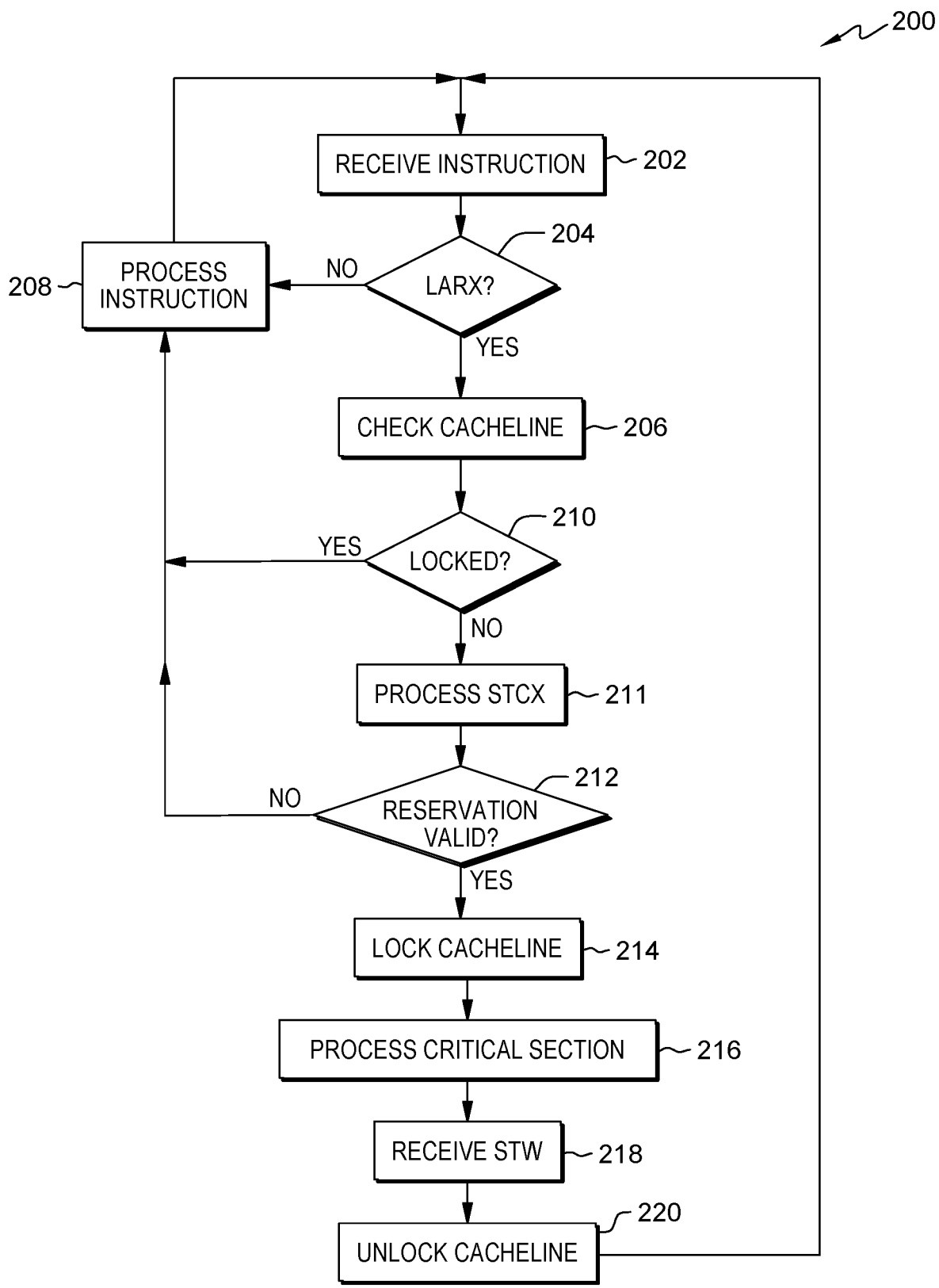
FIG. 2 is a flow chart diagram depicting operational steps for L2 cache program 150 setting and resetting thread n locked cycles, in accordance with at least one embodiment of the invention.

FIG. 2 is a flow chart diagram of workflow 200 depicting operational steps for L2 cache program 150 for setting and resetting thread n locked cycles in accordance with at least one embodiment of the invention. In an alternative embodiment, the steps of workflow 200 may be performed by any other program (not shown) while working with L2 cache program 150. For example, and as noted above, steps of workflow 200 may be performed by an L2 unit associated with L2 cache 122, dispatch 135, ISU 134, LSU 138, or any other hardware/software unit in processor unit 120. It should be appreciated that embodiments of the present invention provide at least for setting and resetting thread n locked cycles. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, L2 cache program 150 can invoke workflow 200 upon receiving an indication from dispatch 135 of an instruction for processing.

L2 cache program 150 receives instruction (step 202). At step 202, L2 cache program 150 receives an instruction for processing from dispatch 135. In an embodiment, the processing of instruction is done by thread 132-$n$. For example, L2 cache program 150 may receive an instruction for processing by thread 132-1.

L2 cache program 150 determines whether the instruction is a larx (decision step 204). In other words, L2 cache program 150 determines whether the instruction that was received from dispatch 135 is a larx instruction. In an embodiment, if L2 cache program 150 determines the instruction is a larx, (decision step 204, yes branch), processing proceeds to step 206. In an embodiment, if L2 cache program 150 determines the instruction is not a larx (decision step 204, no branch), processing proceeds to step 208.

L2 cache program 150 checks the cacheline (step 206). At step 206, L2 cache program 150 checks the cacheline the larx is trying to access to determine whether the cacheline is locked. L2 cache program 150 determines the cacheline is locked if the cacheline is set to "1". L2 cache program 150 determines the cacheline is unlocked if the cacheline is set to "0". L2 cache program 150 will determine the cacheline is "1" or "0".

L2 cache program 150 determines whether the cacheline is locked (decision step 210). At decision step 210, L2 cache program 150 determines whether the cacheline is locked based on the information determined in step 206. In an embodiment, if L2 cache program 150 determines the cacheline is locked, (decision step 210, yes branch), processing proceeds to step 208. In an embodiment, if L2 cache program 150 determines the cacheline is unlocked (decision step 210, no branch), processing proceeds to step 211.

L2 cache program 150 processes the stcx (step 211). In other words, L2 cache program 150 processes the stcx associated with the larx received in step 202.

L2 cache program 150 determines whether the reservation is valid (decision step 212). In other words, when the larx checks the cacheline in step 206, a reservation flag is set for that the thread processing the larx. If a store from another thread or core stores to the address of the larx, the reservation flag is reset. When a stcx is attempted, it will be allowed to successfully store if the reservation flag is still valid (decision step 212, yes branch). Otherwise, the stcx will be unsuccessful and not perform any store and will not lock the cacheline (decision step 212, no branch). In an embodiment, if L2 cache program 150 determines the reservation is not valid, (decision step 212, no branch), processing proceeds to step 208. In an embodiment, if L2 cache program 150 determines if the reservation is valid (decision step 212, yes branch), processing proceeds to step 214.

L2 cache program 150 locks the cacheline (step 214). At step 214, L2 cache program 150 locks the cacheline thread 132-*n* indicated by the received larx instruction. In an embodiment, L2 cache program 150 sets the cacheline to "1" in order to indicate a lock on the cacheline. In an embodiment, L2 cache program 150 indicates that thread 132-*n*, the thread processing the larx instruction, has a lock critical section by initiating lock_crit_sect(n) where n is the thread. A lock_crit_sect is set as "1" for thread 132-*n* when the lock_crit_sect is initiated. In other words, thread 132-*n* is locked or "1". In an embodiment, L2 cache program 150 may store the lock_crit_sect(n) indication in information repository 140 or in a hardware unit associated with dispatch 135, as discussed above. In an embodiment, if the lock_crit_sect(n) is set as "1" or locked, a counter is initialized which counts the number of cycles that the lock_crit_sect(n) is set as "1" or locked. In an embodiment, the counter is stored in information repository 140. In an embodiment, lock_crit_sect(n) is the same as "thread n locked" discussed above. Here, the dispatch 135 will receive the lock_crit_sect(n) from the L2 unit in L2 cache 122. The lock_crit_sect(n) represents the state between a successful stcx (lock) and the store release lock (unlock) where the instructions are being done using the memory that is locked. Here, dispatch 135 uses this lock_crit_sect(n) signal to enable the counting of cycles while locked.

L2 cache program 150 processes the critical section (step 216). In other words, L2 cache program 150 processes the critical section associated with the larx received in step 202. In an embodiment, the critical section may be part of step 214, discussed previously, which locks the cacheline and stores conditional.

L2 cache program 150 receives stw (step 218). In other words, L2 cache program 150 has processed the stcx associated with the larx received in step 202 and the stw indicates that the lock can be released.

L2 cache program 150 unlocks the cacheline (step 220). In other words, L2 cache program 150 performs the opposite of step 214. In an embodiment, L2 cache program 150 sets the cacheline to "0" in order to indicate no lock on the cacheline. In an embodiment, L2 cache program 150 indicates that thread 132-*n*, the thread processing the larx instruction, has unlocked the critical section by initiating lock_crit_sect(n) where n is the thread. A lock_crit_sect is set as "0" for thread 132-*n* when the lock_crit_sect is initiated and the thread is already set to "1". In other words, after the lock_crit_sect(n), thread 132-*n* is unlocked or "0". In an embodiment, L2 cache program 150 may store the lock_crit_sect(n) indication in information repository 140 or in dispatch 135, as discussed previously. In an embodiment, if the lock_crit_sect(n) is set as "1" or locked, the counter that counts the number of cycles that the lock_crit_sect(n) is set as "1" or locked is reset. In an embodiment, the counter is stored in information repository 140.

Figure 3:
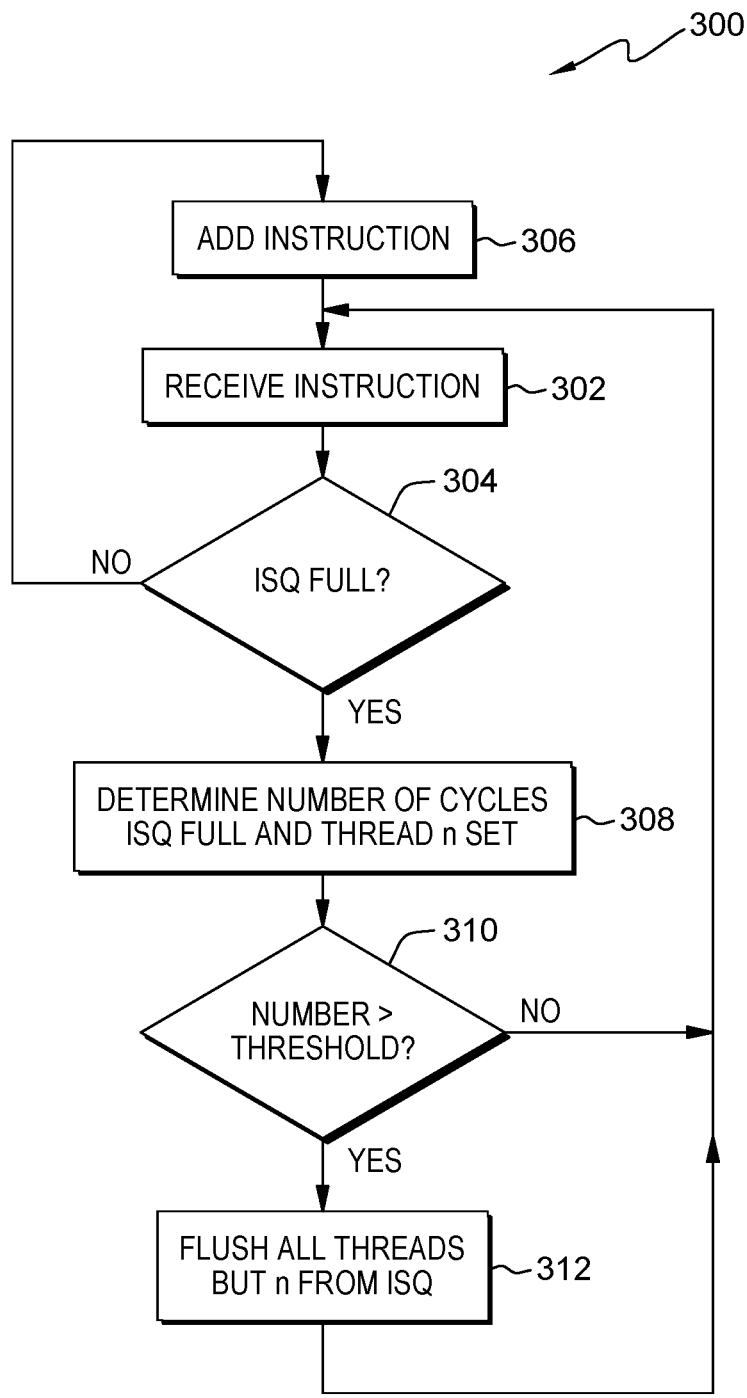
FIG. 3 is a flow chart diagram depicting operational steps for L2 cache program 150 for flushing ISQ, in accordance with at least one embodiment of the invention.

FIG. 3 is a flow chart diagram of workflow 300 depicting operational steps for L2 cache program 150 for flushing ISQ 136 in accordance with at least one embodiment of the invention. In an alternative embodiment, the steps of workflow 300 may be performed by any other program (not shown) while working with L2 cache program 150. For example, and as noted above, steps of workflow 300 may be performed by an L2 unit associated with L2 cache 122, dispatch 135, ISU 134, LSU 138, or any other hardware/software unit in processor unit 120. It should be appreciated that embodiments of the present invention provide at least for flushing ISQ 136. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 300 upon receiving an indication from dispatch 135 of an instruction for processing.

L2 cache program 150 receives instruction (step 302). At step 302, L2 cache program 150 receives an instruction for processing from dispatch 135. In an embodiment, the processing of instruction is done by thread 132-*n*. For example, L2 cache program 150 may receive an instruction for processing by thread 132-1.

L2 cache program 150 determines whether ISQ 136 is full (decision step 304). In other words, L2 cache program 150 determines whether ISQ 136 is full of instructions or there is room for more instructions to be added to ISQ 136. In an embodiment, L2 cache program 150 may query dispatch 135 to determine if ISQ 136 and receive an indication from dispatch 135. In an embodiment, if L2 cache program 150 determines ISQ is not full (decision step 304, no branch), processing proceeds to step 306. In an embodiment, if L2 cache program 150 determines ISQ is full (decision step 304, yes branch), processing proceeds to step 308.

L2 cache program 150 adds instruction to ISQ 136 (step 306). At step 306, L2 cache program 150 adds the instruction received in step 302 to ISQ 136. In other words, L2 cache program 150 indicates to dispatch 135 to add the received instruction from step 302 to ISQ 136.

L2 cache program 150 determines the number of cycles ISQ 136 is full and thread 132-n is set (step 308). At step 308, L2 cache program 150 determines the number of cycles ISQ 136 is full and thread 132-n is set by accessing the counter in information repository 140. In other words, L2 cache program 150 determines all threads 132-n that utilize ISQ 136 and then queries information repository 140 to determine the data found in the counter, discussed above in step 214 and step 220, for each thread 132-n that utilizes ISQ 136. As discussed previously, the counter is the number of cycles that thread 132-n has a lock_crit_sect set to "1".

L2 cache program 150 determines whether the number is greater than a threshold (decision step 310). In other words, L2 cache program 150 determines whether any thread 132-n has a counter that is greater than a threshold. In an embodiment, the threshold may be found in information repository 140. For example, the threshold may be 32 cycles. In an embodiment, the threshold may be determined by user input and/or by operating system presets. In an embodiment, if L2 cache program 150 determines the number is less than the threshold (decision step 310, no branch), processing proceeds to step 302. In an embodiment, if L2 cache program 150 determines the number is greater than a threshold (decision step 310, yes branch), processing proceeds to step 312. In an embodiment, L2 cache program 150 determines the number is greater than a threshold for a specific thread, 132-n. For example, thread 132-1.

L2 cache program 150 flushes all threads but thread 132-n from ISQ 136 (step 312). At step 312, L2 cache program 150 indicates to flush ISQ 136 of all instructions that are found in ISQ 136 that are not from thread 132-n that was determined to have a number greater than a threshold. In an embodiment, this step is performed by dispatch 135. In other words, thread 132-n, and more specifically in an example discussed above, thread 132-1, has a number of cycles where the ISQ 136 was full that is greater than a threshold. Therefore, L2 cache program 150 indicates to flush ISQ 136 of all instructions that are not from thread 132-1. In an embodiment, after the flush, ISQ 136 will only contain instructions that are to be processed by thread 132-1, the thread that has a number of cycles where the ISQ 136 was full that is great than a threshold, as determined in decisions step 310. Processing then proceeds to step 302.

A few simple examples will now be discussed. In a first example, thread A and thread B both provide instructions to ISQ 136. Over the course of computing, Thread A and Thread B provide instructions to ISQ 136 and lock cachelines based on the larx/stcx instructions received. Here, thread A receives a larx instruction from dispatch 135 related to cacheline X. It is determined cacheline X is not locked, so the subsequent stcx instruction associated with the larx locks cacheline X and the instruction is added to ISQ 136. Additionally, thread A also has a lock_crit_sect set as "1" in information repository 140 and a counter is created. At this point the counter is set to 0. If a processor cycle is complete and the ISQ 136 is full, the counter increases by an increment of one for every cycle completed and the ISQ 136 is full. Thread B receives a larx instruction from dispatch 135 related to any cacheline. The cacheline needed by thread B is not locked, therefore the subsequent stcx instruction associated with the larx locks the cacheline and the instruction is added to ISQ 136. However, at this time, ISQ 136 is full and therefore the instruction for Thread B cannot be added to ISQ 136. The counter value is then determined for thread A and is compared to a threshold. If the counter value is greater than a threshold, then the ISQ 136 is flushed of all instructions from thread B but all instructions from thread A remain in ISQ 136. This allows for thread A instructions to be processed faster including access to cachelines they may not have had access to earlier due to a lock held by an instruction of thread B that was in ISQ 136.

In a second example, thread B branch prediction is trained such that in the larx (FIG. 2, step 204)/cmp (FIG. 2, step 206)/br (FIG. 2, step 210) instruction sequence, the branch prediction predicts that a locked value will be read for the larx so the branch goes back to the larx. This has the effect of filling up the ISQ with larx/cmp/br/larx/cmp/br/larx/cmp/br. Continuing the example, iff thread B were allowed to execute unimpeded, one of the larx would eventually read an unlocked value and the branch initiate a flush of all remaining larx/cmp/br instructions and instead follow step 210, no branch and try to perform the stcx. However, the first larx for thread B will not be allowed to get data from the L2 cache until thread A is out of its thread n locked state (because the optimal state for thread B is to wait until thread A is unlocked and send an unlocked value to the thread B larx). However, thread A cannot become unlocked until thread A performs its critical section and is able to store an unlocked value with the lock release store at the end of the critical section. However, thread A cannot dispatch into the ISQ whatever remains of the critical section including the lock release store because thread B filled up the ISQ with instructions that will not be removed from the ISQ until the first larx of thread B is able to return a result.

Figure 4:
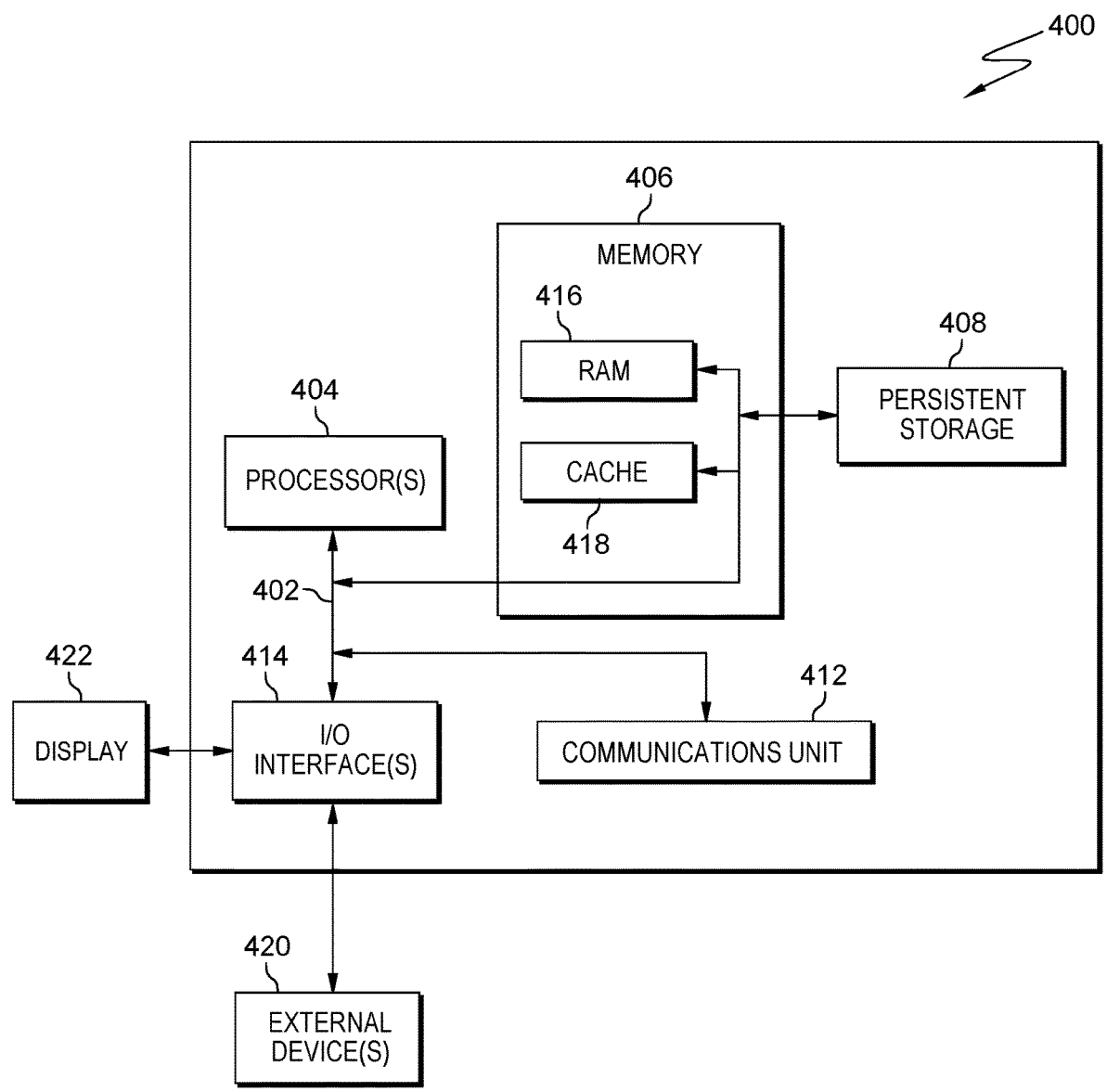
FIG. 4 is a block diagram depicting components of a computer, generally designated 400, suitable for executing L2 cache program 150, in accordance with at least one embodiment of the invention.

FIG. 4 is a block diagram depicting components of a computer 400 suitable for L2 cache program 150, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random-access memory (RAM) 416 and a cache 418. In general, the memory 406 may comprise any suitable volatile or non-volatile one or more computer readable storage media.

Program instructions for L2 cache program 150 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for prioritization of threads, the computer-implemented method comprising:
   receiving, by one or more computer processors, a first instruction for processing by a processor core;
   determining, by one or more computer processors, whether the first instruction is a larx;
   responsive to determining the first instruction is the larx, determining, by one or more computer processors, whether a cacheline associated with the larx is locked; and
   responsive to determining the cacheline associated with the larx is not locked, locking, by one or more computer processors, the cacheline associated with the larx and starting, by one or more computer processors, a counter associated with a first thread of the processor core, wherein the first thread is processing the first instruction;
   wherein the counter associated with the first thread processing the first instruction increases by one for each cycle that an issue queue of the processor core is full.

2. The computer-implemented method of claim 1, further comprising:
   receiving, by one or more computer processors, a second instruction for processing by the processor core, wherein a second thread of the processor core is processing the second instruction;
   determining, by one or more computer processors, an issue queue for processing the second instruction is full;
   responsive to determining the issue queue is full, determining, by one or more computer processors, a value of the counter associated with the first thread.

3. The computer-implemented method of claim 2, further comprising:
   determining, by one or more computer processors, whether the value is greater than a threshold;
   responsive to determining the value is greater than the threshold, flushing, by one or more computer processors, the issue queue of all instructions that are not being processed by the first thread.

4. The computer-implemented method of claim 3, wherein the flushing is done by a dispatch hardware unit associated with the issue queue.

5. The computer-implemented method of claim 1, wherein the larx instruction is selected from the group consisting of a lwarx, ldarx, lharx, and lbarx.

6. The computer-implemented method of claim 3, wherein the threshold is 32.

7. A computer program product for prioritization of threads, the computer program product comprising:
   one or more computer readable storage media; and
   program instructions stored on the one or more computer readable storage media, the program instructions comprising:
   program instructions to receive a first instruction for processing by a processor core;
   program instructions to determine whether the first instruction is a larx;
   responsive to determining the first instruction is the larx, program instructions to determine whether a cacheline associated with the larx is locked; and
   responsive to determining the cacheline associated with the larx is not locked, program instructions to lock the cacheline associated with the larx and starting, by one or more computer processors, a counter associated with a first thread of the processor core, wherein the first thread is processing the first instruction;
   wherein the counter associated with the first thread processing the first instruction increases by one for each cycle that an issue queue of the processor core is full.

8. The computer program product of claim 7, further comprising program instructions stored on the one or more computer readable storage media, to:
   receive a second instruction for processing by the processor core, wherein a second thread of the processor core is processing the second instruction;
   determine an issue queue for processing the second instruction is full; and
   responsive to determining the issue queue is full, determine a value of the counter associated with the first thread.

9. The computer program product of claim 8, further comprising program instructions stored on the one or more computer readable storage media, to:
   determine whether the value is greater than a threshold; and
   responsive to determining the value is greater than the threshold, flush the issue queue of all instructions that are not being processed by the first thread.

10. The computer program product of claim 9, wherein the flushing is done by a dispatch hardware unit associated with the issue queue.

11. The computer program product of claim 7, wherein the larx instruction is selected from the group consisting of a lwarx, ldarx, lharx, and lbarx.

12. The computer program product of claim 9, wherein the threshold is 32.

13. A computer system for prioritization of threads, the computer system comprising:
   one or more computer processors;
   one or more computer readable storage media; and
   program instructions, stored on the one or more computer readable storage media for execution by at least one of the one or more computer processors, the program instructions comprising:
      program instructions to receive a first instruction for processing by a processor core;
      program instructions to determine whether the first instruction is a larx;
      responsive to determining the first instruction is the larx, program instructions to determine whether a cacheline associated with the larx is locked; and
      responsive to determining the cacheline associated with the larx is not locked, program instructions to lock the cacheline associated with the larx and starting, by one or more computer processors, a counter associated with a first thread of the processor core, wherein the first thread is processing the first instruction;
      wherein the counter associated with the first thread processing the first instruction increases by one for each cycle that an issue queue of the processor core is full.

14. The computer system of claim 13, further comprising program instructions stored on the one or more computer readable storage media for execution by at least one of the one or more computer processors, to:
   receive a second instruction for processing by the processor core, wherein a second thread of the processor core is processing the second instruction;
   determine an issue queue for processing the second instruction is full; and
   responsive to determining the issue queue is full, determine a value of the counter associated with the first thread.

15. The computer system of claim 14, further comprising program instructions stored on the one or more computer readable storage media for execution by at least one of the one or more computer processors, to:
   determine whether the value is greater than a threshold; and
   responsive to determining the value is greater than the threshold, flush the issue queue of all instructions that are not being processed by the first thread.

16. The computer system of claim 15, wherein the flushing is done by a dispatch hardware unit associated with the issue queue.

17. The computer system of claim 13, wherein the larx instruction is selected from the group consisting of a lwarx, ldarx, lharx, and lbarx.

* * * * *